United States Patent [19]

Sheps et al.

[11] 4,335,512
[45] Jun. 22, 1982

[54] ATTACHMENT FOR A POWER HAND SAW

[75] Inventors: Martin I. Sheps, Poway; George S. Christensen, San Diego; George E. Robson, Hermosa Beach, all of Calif.

[73] Assignee: Portalign Toll Corporation, San Diego, Calif.

[21] Appl. No.: 169,863

[22] Filed: Jul. 17, 1980

[51] Int. Cl.³ .............................................. B27B 9/04
[52] U.S. Cl. ........................................ 30/376; 83/745
[58] Field of Search ................ 30/371, 372, 373, 374, 30/375, 376; 83/745, 455

[56] References Cited

U.S. PATENT DOCUMENTS

| 2,735,455 | 2/1956 | Forsberg | 83/745 |
| 2,942,633 | 6/1960 | King | 83/745 |
| 3,011,530 | 12/1961 | Lamb | 83/745 |
| 3,903,774 | 9/1975 | Stinson | 83/745 X |
| 4,059,038 | 11/1977 | Rietema | 83/745 |
| 4,078,309 | 3/1978 | Wilson | 30/375 |

Primary Examiner—Jimmy C. Peters
Attorney, Agent, or Firm—Fitch, Even, Tabin, Flannery & Welsh

[57] ABSTRACT

A device is described for facilitating repeated cuts with a portable hand-held power saw. The device employs relatively slideable guides for guiding the saw through a cutting path. The saw is attached to one of the sliding guides in a manner such that the saw shoe lies very close to the work-piece surface and is offset from the relatively slideable guide, thereby avoiding substantial reduction in the depth of available cut of the saw.

12 Claims, 4 Drawing Figures

ATTACHMENT FOR A POWER HAND SAW

This invention relates to attachments for portable power tools. More particularly, the invention relates to a device for facilitating repeated cuts with a portable hand-held power saw.

Various devices are known in the prior art for guiding portable hand-held power saws. Such devices range from simple to complex and have taken a variety of forms. One such device is shown and described in U.S. Pat. No. 3,903,774, this patent having been assigned to the assignee of the present invention.

The device described in the foregoing patent facilitates repeated cuts with a portable hand-held power saw by means of relatively slideable guides employed for guiding the saw through a cutting path.

The present invention relates to an improvement on devices such as that shown and described in U.S. Pat. No. 3,903,774. By the present invention, reduction in the depth of cut by use of the device is minimized. Moreover, very high accuracy and improved versatility in use is provided by the invention. Finally, the device of the invention achieves these objects at a minimum of manufacturing cost.

Such objects as these and others will become more apparent from the following description taken in connection with the accompanying drawings wherein.

Figure 1:
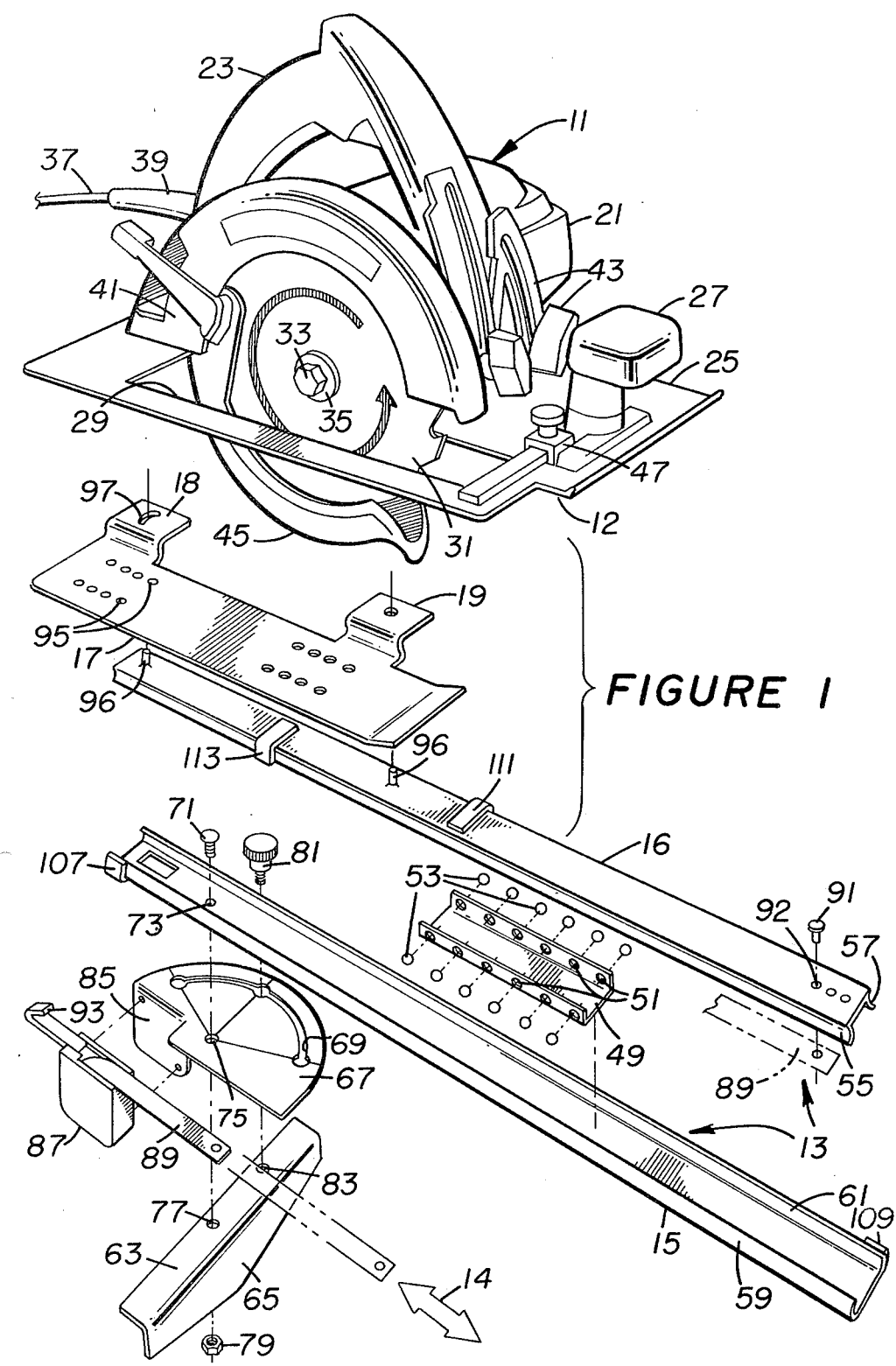
FIG. 1 is an exploded perspective view of the device of the invention and of a power saw used in connection therewith.

Very generally, the device of the invention facilitates repeated cuts with a portable hand-held power saw 11 having a saw shoe bearing surface 12. Relatively slideable guide means 13 are employed for guiding the saw through a cutting path 14. The improvement of the invention constitutes the configuration wherein the guide means 13 comprise a first elongated member 15 having a flat surface adapted to lie against the surface of a work-piece. The guide means further comprise a second elongated member 16 movable on the first elongated member 15 with respect thereto. A relatively thin mounting plate 17 is preferably adapted for attachment to the saw shoe bearing surface 12. However, it would also be possible within the scope of the invention to attach a suitably adapted mounting plate to the upper surface of the saw shoe 25. Means 18 and 19 attach the mounting plate 17 to the second elongated member 16 such that the mounting plate lies against the work-piece at a position relatively offset from the first elongated member 15. Accordingly, the depth of cut of the saw when used with the device of the invention is reduced only by the thickness of the mounting plate 17.

Figure 2:
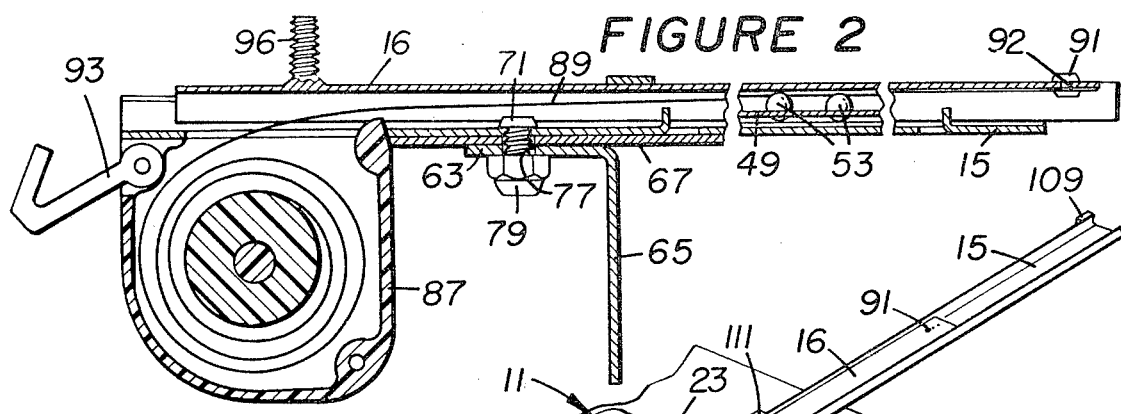
FIG. 2 is a full section view of an assembled device of the invention of the embodiment shown in FIG. 1.

Referring now more particularly to FIGS. 1 and 2, the portable saw 11 shown therein is illustrated for general explanatory purposes. It is not intended that the invention be limited to this type of saw. Rather the invention may be employed with a portable saw of any suitable conventional design.

The illustrated saw 11 includes a motor housing 21, a handle structure 23 secured to the housing, a shoe 25, the lower surface of which constitutes the surface 12, and a steadying handle 27 mounted to the shoe 25. An opening 29 formed in the shoe permits the circular blade 31 of the saw to extend downwardly beneath the surface 12. The rotary saw blade 31 is attached by a nut 33 and washer 35 to the motor spindle, not shown, the motor being enclosed in the housing 21. Electrical attachment to the motor is provided by a cord 37 and strain relief 39. The portion of the circular blade 31 extending above the shoe 25 is protected by a housing 41, and the angle of the blade 31 with respect to the shoe 25 may be adjusted by a bevel adjustment assembly 43, as is known in the art. A safety protection device 45 covers the saw blade when it is not cutting a work-piece, but pivots out of the way into the guard 41 as the saw is moved into the work-piece, as is known in the art. A suitable attachment is also provided, shown at 47, for holding a rip fence for the saw as is known in the art.

The slideable guide means 13 illustrated in FIGS. 1 and 2 comprise an elongated channel 15 which is, when in use, disposed with its open side upward and its flat underside positioned against the work-piece, not shown. The elongated slide 16, in the illustrated embodiment, comprises an elongated channel 16 of roughly the same length as the channel 15. The channel 16 is of a width such that it fits within the channel 15 and is disposed such that its open side is downwardly with respect to the open side of the channel 15. Of course, the reverse configuration would also be feasible, with the channel 15 fitting within the channel 16.

To facilitate relative movement between the channels 15 and 16 and to prevent relative lateral movement between the two pieces, a ball bearing guide assembly is provided. This guide assembly includes a ball bearing race channel 49 having a plurality of openings 51 therein in which ball bearings 53 are disposed. The side walls 55 and 57 of the channel 16 are made concave inwardly. The side channels 59 and 61 of the elongated guide 15 are made concave outwardly. Accordingly, when the channel 16 is disposed within the channel 15, the balls 53 fit between the respective pairs of sidewalls 55, 59 and 57, 61 forming the raceway for the ball bearings. While ball bearings are excellent in providing smooth, accurate action to the device, an approximation of this action may be achieved with other types of bearings—such as short lengths of steel or plastic rod. As used herein, the term bearing guide means is intended to cover all such equivalents.

A fence 63 is secured to the underside of the channel 15 and has a fence surface 65 which is adapted to bear against the edge of a work piece, not shown in FIGS. 1 and 2. Positioned between the upper surface of the fence 63 and the channel 15 is a protractor or angle adjustment device 67 which contains an arcuate slot 69. Securing of the fence 63 to the channel 15 is by means of a screw 71 which extends through aligned openings 73, 75, and 77 in the channel 15, protractor 67, and fence 77, respectively. A nut 79 secures the screw 71 in place while permitting the fence 67 to pivot with respect to the channel 15. The protractor 67, on the other hand, is secured against pivotal movement with respect to the channel 15 by suitable spot welds, not shown. A thumb screw 81 threads into an opening 83 provided in the upper surface of the fence 63 aligned with the arcuate slot 69. By means of the screw 81, the angular relationship of the fence 63 to the channel 15 may be adjusted and secured at a desired position for angular cutting, described below in connection with FIG. 4.

The protractor 67 is provided with a downwardly depending bracket 85. A take-up spool assembly 87 is secured to the bracket 85 and contains a band 89 of flexible metal or similar material which rolls up in the spool assembly 87. The band 89 in the take-up spool assembly, is formed from spring steel and acts as a constant force spring exerting constant tension on the slide member 16 regardless of the amount of extension.

In the assembled condition, the band 89 is secured to one end of the channel 16 by means of a rivet 91 passing through an opening 92 provided in the upper surface of the channel 16. The band 89 extends along the underside of the upper surface of the channel 16 in the space between the channel 16 and the channel 15. For the purpose of locking the channels 16 and 15 in a fully telescoped relationship, as will be described, a pivotal hook 93 is mounted to the spool assembly 87 adjacent one end of the channels 15 and 16.

For the purpose of supporting the saw with respect to the slideable guide means 13, a relatively thin mounting plate 17 is utilized. The plate 17 is of a thickness which is sufficient to provide structural support and rigidity for the saw with respect to the device of the invention. However, the bracket or plate 17 is sufficiently thin so as to minimize the amount of loss in the depth of cut when the saw is mounted as described.

A plurality of mounting holes 95 are provided in the mounting plate 17. These holes are located appropriately for the manufacturers make and model of the saw which the user of the device of the invention wishes to employ. These holes may be placed therein by the purchaser of the device in accordance with a suitable template provided by the manufacturer, or may be predrilled for all makes to provide "universal" mounting.

The saw 11 is mounted to the plate 17 with the surface 12 bearing against the upper surface of the plate 17. The two attaching means 18 and 19 comprise brackets which are in a generally L shape so as to enable the plate 17 to be secured to the top surface of the channel 16 by threaded studs 96 on the channel 16. The screws utilized are preferably wing nuts so that the saw 11 and attached mounting plate 17 may be readily removed as a unit from the remainder of the device. By this means, the saw may be used with or without the device with a minimal amount of connection and disconnection required.

For fine tuning the alignment of the saw with respect to the device, the hole 97 in the bracket 18 is made elongated. In this way, the guide means 13 may be pivoted relative to the saw 11 in order to align the saw blade 31 with respect to the guide means 13.

To prevent the channels 15 and 16 from coming apart during operation, a stop 107 acts against a stop arm 111 and a stop 109 acts against another stop arm 113 to limit movement of the channels 15 and 16 at their extreme positions. These stops effectively encapsulate relative movement of the inner slide 16 and the outer slide 15.

In operating with the device of the invention, after securing the plate 17 to the saw shoe 25, the operator locks the desired angle of cut into the angle indicator plate or protractor 67 by means of loosening the screw 81, pivoting the fence 63 to the desired angle, and retightening the knob 81. With the saw held in the normal manner, the operator approaches the work-piece and allows the work-piece angle fence 63 to contact the edge of the work-piece and assume full and flush contact with it. The spring force created by the extension of band 89 maintains the fence 63 in contact with the workpiece and assures that the saw and associated components remain in desired angular alignment to the edge of the work-piece engaged by the fence 63. The saw is then started and the cut is made by simply pushing the saw forward.

Since the saw is secured to the inner channel or slide 16, as the saw moves forward into the cut, the inner slide also moves forward. The ball bearings 63 provide an accurate and smooth interface between the channel 16 and the channel 15 while providing relatively little mechanical resistance and extreme accuracy in use.

The constant force spring or band 89, located behind the fence 63, and permanently attached in a fixed position with respect to the slide 15, provides a constant resistance to movement of the slide 16 forward with the saw with respect to the slide 15. As the saw is pushed forward, the band 89 uncoils from the housing 87 and provides a constant resistance to the saw. Once the cut is completed, the saw may be removed from the work-piece and the spring once again moves the channels 16 and 15 back to the starting position. The stops 107 and 109 prevent the inner slide or channel 16 from exiting the outer slide or channel 15.

Figure 3:
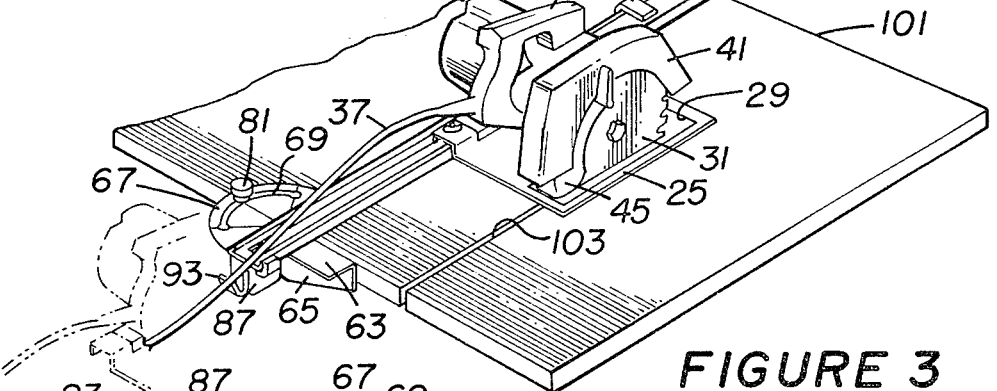
FIG. 3 is a perspective view illustrating the invention in use for cross-cutting.

As may be seen in FIG. 3, the work-piece 101 is shown as a relatively wide flat board. The work-piece, suitably supported by means, not shown, is cut by the saw at the cut 103. In the starting position, the channel 16 may be withdrawn to the position shown by the dotted lines. Near the conclusion of the cut, the channel 16 will move through the position shown on the solid lines in FIG. 3 as the saw moves through the cut. In FIG. 3, the cut is shown as being perpendicular or at right angles to the edge of the work-piece. Once the cut is complete, the relative position of the channels 15 and 16 returns to that of the start because of the band 89.

Figure 4:
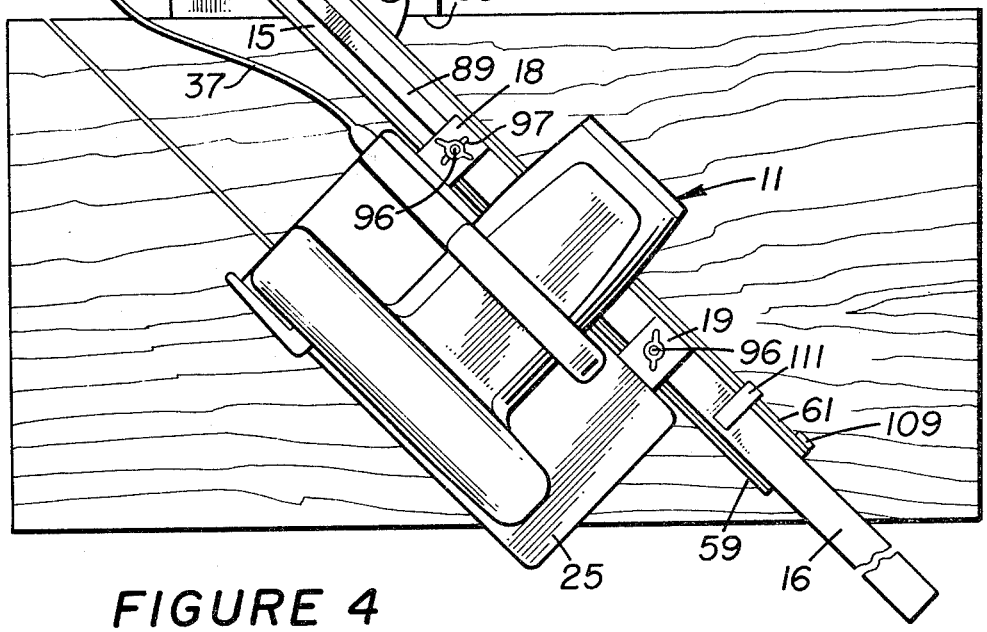
FIG. 4 is a top plan view of the device of the invention in use for cutting at an angle.

FIG. 4 shows the saw used to make an angle cut, wherein the fence 63 is located at approximately 45° with respect to the direction of travel of the cut. The cut in FIG. 4 is shown at 105.

To make a chamfer cut, the saw may be used just as it would normally be used without the attachment—by appropriately adjusting the mechanism 43 (FIG. 1). The device does not interfere with the cut or the saw when in the bevel position.

It may be seen, therefore, that the device of the invention represents a substantial improvement in devices for facilitating repeated cuts with portable hand-held power saws. Since the device itself is laterally displaced from the saw during operation, the articulated mechanical adjustments that typical commercially available portable hand saws are provided with, such as depth of cut and chamfer adjustments, remain unimpeded and fully usable. The invention provides accurate movement of the saw with respect to the work-piece, ready adjustment of the angle of cut, and ready removal of the saw from the device for the use in other applications, such as ripping operations.

Various modifications of the invention in addition to those shown and described herein will become apparent to those skilled in the art from the foregoing description and accompanying drawings. Such modifications are intended to fall within the scope of the appended claims.

What is claimed:

1. In a device for facilitating repeated cuts with a portable hand-held power saw having a saw shoe bearing surface, and wherein relatively slideable guide means are employed for guiding the saw through a cutting path, the improvement wherein said guide means comprise a first elongated slide having a flat surface adapted to lie against the surface of a work-piece, said guide means further comprising a second elongated slide movable on said first slide with respect thereto, a relatively thin mounting plate adapted for attachment to the saw shoe, means for attaching said mounting plate to said second elongated slide such that said mounting plate lies against the work-piece and at a position laterally offset from said first elongated slide, and spring means providing a substantially constant force against movement of said second elongated slide relative to said first elongated slide in the direction of the saw cut.

2. A device according to claim 1 wherein said first and second elongated slides comprise a pair of elongated channels with the parallel sides of one lying within the parallel sides of the other.

3. A device according to claim 2 wherein bearing guide means are disposed between the parallel sides of said first and second elongated slides, respectively.

4. A device according to claim 1 including stop means restricting relative movement of said elongated slides between an extended condition in one direction and an extended condition in another direction to limit overtravel of the saw.

5. A device according to claim 1 wherein said spring means comprise a flexible band on a takeup spool, said takeup spool being mounted on said first elongated slide.

6. A device according to claim 1 including an angularly adjustable fence secured on said flat surface of said first elongated slide.

7. A device according to claim 1 including means for locking said elongated slides in a fully telescoped position.

8. A device according to claim 1 wherein the mounting is attached to the bearing surface of the saw shoe whereby the depth of cut of said saw when used with said device is reduced only by the thickness of said mounting plate.

9. In a device for facilitating repeated cuts with a portable hand-held power saw having a saw shoe bearing surface, and wherein relatively slideable guide means are employed for guiding the saw through a cutting plate, the improvement wherein said guide means comprise a first elongated slide having a flat surface adapted to lie against the surface of a work-piece, said guide means further comprising a second elongated slide movable on said first slide with respect thereto, a relatively thin mounting plate adapted for attachment to the saw shoe, means for attaching said mounting plate to said second elongated slide such that said mounting plate lies against the work-piece and at a position laterally offset from said first elongated slide, an angularly adjustable fence secured on said flat surface of said first elongated slide, and a flexible band on a spring-loaded takeup spool, said takeup spool being mounted on said first elongated slide behind said fence with respect to the direction of saw cut.

10. A device for facilitating repeated cuts with a portable hand-held power saw having a saw shoe bearing surface, comprising, a telescopable guide having a first elongated member with a substantially flat guide surface for bearing on a work-piece and having a second elongated member, bearing means mounting said second elongated member for movement with respect to said first elongated guide member along a cutting path, means coupling said first and second elongated members to provide a predetermined resistance to relative movement of said second elongated member along the cutting path, means for mounting the power saw to said second elongated member to be movable therewith, said mounting means including a mounting plate adapted for connection to the saw shoe and having bracket means of a configuration to position a circular saw with its saw shoe bearing surface displaced laterally from said telescopable guide and lying substantially in the plane of said flat guide surface, means for removably attaching said bracket means to said second elongated member, and a fence mounted to said first elongated member having a substantially flat fence surface lying in a plane perpendicular to the plane of said flat guide surface.

11. A device according to claim 10 wherein said fence includes means mounting same for pivotal movement about an axis which is perpendicular to said flat guide surface on said first elongated member, and means for locking said fence at a selected position about said axis with respect to said first elongated member.

12. A device according to claim 10 including a flexible band on a spring-loaded takeup spool, said takeup spool being mounted on said first elongated slide behind said fence with respect to the direction of saw cut.

* * * * *